(12) United States Patent
Fujimori

(10) Patent No.: US 12,052,757 B2
(45) Date of Patent: Jul. 30, 2024

(54) COMMUNICATION APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yuki Fujimori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 17/245,469

(22) Filed: Apr. 30, 2021

(65) Prior Publication Data

US 2021/0251008 A1    Aug. 12, 2021

Related U.S. Application Data

(63) Continuation of application No. 16/583,503, filed on Sep. 26, 2019, now Pat. No. 11,026,260.

(30) Foreign Application Priority Data

Oct. 3, 2018   (JP) ................................. 2018-188613

(51) Int. Cl.
*H04W 74/08*   (2024.01)
*H04W 74/00*   (2009.01)
*H04W 74/0816*   (2024.01)

(52) U.S. Cl.
CPC ..... *H04W 74/0816* (2013.01); *H04W 74/006* (2013.01)

(58) Field of Classification Search
CPC .......... H04W 74/0816; H04W 74/006; H04W 36/0027; H04W 36/28
See application file for complete search history.

(56) References Cited

U.S. PATENT DOCUMENTS

| | | | |
|---|---|---|---|
| 9,986,566 B2 | 5/2018 | Huang | |
| 11,026,260 B2 * | 6/2021 | Fujimori | ............ H04W 74/006 |
| 2014/0078940 A1 * | 3/2014 | Aggarwal | ......... H04L 12/40013 |
| | | | 370/278 |

(Continued)

FOREIGN PATENT DOCUMENTS

| | | |
|---|---|---|
| JP | 2016119566 A | 6/2016 |
| JP | 2018517311 A | 6/2018 |
| WO | 2016171796 A1 | 10/2016 |

OTHER PUBLICATIONS

Office Action issued in U.S. Appl. No. 16/583,503 mailed Nov. 2, 2020.

(Continued)

*Primary Examiner* — Christine Ng
(74) *Attorney, Agent, or Firm* — ROSSI, KIMMS & McDOWELL LLP

(57) ABSTRACT

A communication apparatus capable of multi-user communication in which signals are multiplexed and communicated to one or more other communication apparatuses, the communication apparatus determines whether to transmit an MU-RTS (Multi User Request To Send) frame based on a size of data scheduled to be transmitted or received in accordance with the multi-user communication, and, in a case where it is determined to transmit the MU-RTS frame, transmits the MU-RTS frame prior to the multi-user communication.

14 Claims, 13 Drawing Sheets

(56) References Cited

U.S. PATENT DOCUMENTS

| | | | | |
|---|---|---|---|---|
| 2015/0264710 | A1* | 9/2015 | Kneckt | H04W 72/0446 370/336 |
| 2016/0127947 | A1* | 5/2016 | Bhanage | H04W 74/002 370/328 |
| 2016/0135142 | A1* | 5/2016 | Lee | H04L 12/1877 370/329 |
| 2016/0315738 | A1* | 10/2016 | Huang | H04W 74/0816 |
| 2017/0006542 | A1* | 1/2017 | Huang | H04W 52/0209 |
| 2017/0064740 | A1* | 3/2017 | Zhou | H04W 74/006 |
| 2017/0195991 | A1* | 7/2017 | Ahn | H04W 72/52 |
| 2017/0257888 | A1* | 9/2017 | Kneckt | H04W 74/0816 |
| 2017/0279568 | A1 | 9/2017 | Huang | |
| 2018/0014334 | A1* | 1/2018 | Ahn | H04W 74/0833 |
| 2018/0077601 | A1* | 3/2018 | Kim | H04L 5/00 |
| 2018/0098355 | A1* | 4/2018 | Islam | H04W 76/10 |
| 2018/0138590 | A1* | 5/2018 | Uchida | H01Q 3/01 |
| 2018/0152860 | A1* | 5/2018 | Huang | H04L 43/16 |
| 2020/0037342 | A1* | 1/2020 | Seok | H04W 74/0808 |
| 2020/0137529 | A1* | 4/2020 | Yu | H04L 27/2607 |

OTHER PUBLICATIONS

Notice of Allowance issued in U.S. Appl. No. 16/583,503 mailed Feb. 11, 2021.

Huang. "MU-RTS/CTS Follow Up" IEEE 802.11-15/1325r0, URL: https://mentor.ieee.org/802.11/dcn/15/11-15-1325-00-00ax-mu-rts-cts-follow-up.pptx, Nov. 9, 2015.

IEEE Std 802.11-2016. IEEE Standard for Information Technology—Telecommunications and information exchange between systems Local and metropolitan area networks—Specific requirements—Part 11: Wireless LAN Medium Access Control (MAC) and Physical Layer (PHY) Specifications. IEEE Computer Society. Dec. 14, 2016. pp. 1330.

IEEE P802.11ax/D3.0, Jun. 2018. IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN, Jun. 2018, pp. 95-108, 204-207, 253.

* cited by examiner

FIG. 11

| Trigger FRAME TYPE | MU-RTS TRANSMISSION |
|---|---|
| Basic | YES |
| BFRP | NO |
| MU-BAR | NO |
| BSRP | NO |
| MU-RTS | NO |
| GCR MU-BAR | NO |
| BQRP | NO |
| NFRP | NO |

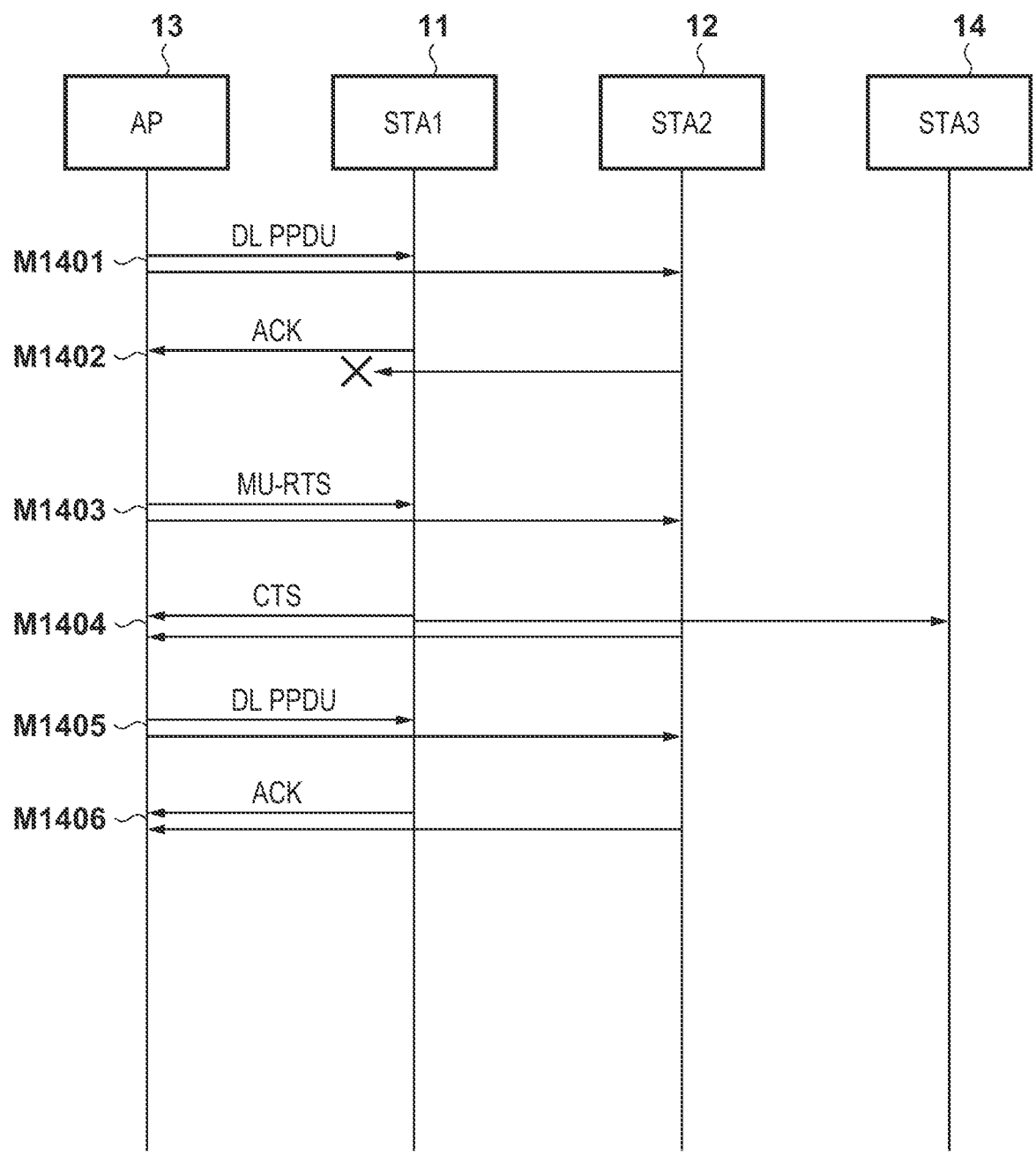

COMMUNICATION APPARATUS, CONTROL METHOD, AND NON-TRANSITORY COMPUTER-READABLE STORAGE MEDIUM

BACKGROUND OF THE INVENTION

Field of the Invention

The present invention relates to interference control techniques for wireless communication.

Description of the Related Art

Information transmitted and received by wireless communication is increasing in sophistication from text data to image data and from image data to moving image data, and the amount of communication is also increasing. Meanwhile, since frequency bands usable in wireless communication are limited, there is the need to multiplex signals at high density in various dimensions such as time, frequency, code, space and the like, increase communication capacity, and improve frequency utilization efficiency.

Against this background, attempts have been made to increase communication capacity in a wireless LAN (Local Area Network) by introducing techniques such as sophisticated multi-level modulation, channel bonding, or MIMO (Multiple-Input and Multiple-Output). For example, IEEE (Institute of Electrical and Electronics Engineers) is considering IEEE 802.11ax as a next-generation wireless LAN standard with high efficiency (HE). In order to improve the frequency utilization efficiency, IEEE 802.11ax proposes the adoption of OFDMA in which it is possible to allocate the structure of a frequency channel, which is conventionally used with a unit of a frequency bandwidth of 20 MHz, to a plurality of terminals with a unit of a narrower frequency bandwidth. Note that OFDMA is an acronym for Orthogonal Frequency Division Multiple Access and is a multi-user (MU) communication method for multiplexing signals of a plurality of users.

In IEEE 802.11ax, by OFDMA, at least a portion of a 20 MHz wide frequency band is allocated to up to nine users. If there is one user, all of the 20 MHz wide frequency band may be assigned to that user, whereas if there are two or more users, each user is assigned a non-overlapping portion of the 20 MHz wide frequency band. Similarly, if frequency bands having widths of 40 MHZ, 80 MHz, and 160 MHz are used, up to 18, 37, and 74 users, respectively, are assigned at least a portion of the respective frequency band.

In the MU communication method according to OFDMA considered in IEEE 802.11ax, the spacing between subcarriers is changed from 312.5 kHz, which has been used in the OFDM of IEEE 802.11a/g/n/ac, which are conventional standards, to 78.125 kHz. For this reason, a wireless LAN device that only supports standards prior to IEEE 802.11ax (hereinafter referred to as a "legacy device") basically cannot demodulate a signal communicated by the MU communication method of IEEE 802.11ax. However, a wireless LAN device that supports IEEE 802.11ax (hereinafter referred to as a "HE device") is configured to be capable of demodulating a signal communicated by a legacy device and transmitting a signal that can be demodulated by a legacy device.

Between legacy devices, a transmitting side apparatus may transmit an RTS (Request To Send) frame and a receiving side apparatus may transmit a CTS (Clear To Send) frame to avoid communication interference. These RTS/CTS frames include a NAV (Network Allocation Vector, a so-called transmission-prohibited period) as information of periods during which it is expected that a channel corresponding to a neighboring wireless LAN device is occupied. When a different wireless LAN device, which is present in the vicinity of the transmitting side apparatus that transmitted an RTS frame and the receiving side apparatus that transmitted a CTS frame, receives an RTS frame or a CTS frame, the different wireless LAN device does not transmit a signal in a notified NAV period. Since a HE device can correctly demodulate a signal transmitted by a legacy device, the HE device does not transmit a signal during a NAV period. As a result, the different wireless LAN device, which is present in the vicinity of the transmitting side apparatus that transmitted an RTS frame and the receiving side apparatus that transmitted a CTS frame does not transmit a signal regardless of whether it is a legacy device or a HE device, and therefore, interference with the signal transmitted by the transmitting side apparatus is suppressed. In communication between legacy devices, an RTS frame issued from a transmitting side apparatus and a CTS frame issued from a receiving side apparatus are never simultaneously transmitted from a plurality of devices in the same channel.

However, in IEEE 802.11ax, in order to adapt RTS frames and CTS frames to the MU communication method, a combination of MU-RTS (Multi User RTS) frames, and simultaneous CTS response frames are used (specification of US-2017-0279568). Specifically, an access point (AP) transmits an MU-RTS frame. The MU-RTS frame is transmitted in the form (format) of an HT PPDU ((PLCP (Physical Layer Convergence Protocol) Protocol Data Unit)) which can be demodulated by legacy devices that support HT (High Throughput) (wireless LAN devices of 802.11n or later) or in the form of a non-HT PPDU or a non-HT Duplicate PPDU which are able to be demodulated by all legacy devices. A legacy device capable of demodulating an MU-RTS frame can update its NAV using the value of a Duration Field included in the frame. Each terminal that performs MU communication simultaneously transmits a CTS frame of the same content in response to an MU-RTS from an AP. Since each terminal transmits a CTS frame, a terminal that can receive the CTS frames can appropriately set the NAV even if it cannot receive the MU-RTS frame from the AP. Note that the CTS frame is transmitted in a format that can be demodulated by a legacy device.

Since MU-RTS/CTS processing is overhead for data communication, performing MU-RTS/CTS processing during all MU communication times reduces bandwidth usage efficiency. However, there is a problem that, when MU-RTS/CTS processing is not performed, transmitted packets may interfere with each other due to the effect of a hidden terminal.

SUMMARY OF THE INVENTION

In view of the above problems, the present invention provides a technique for efficiently performing interference suppression control in multi-user communication.

According to one aspect of the present invention, there is provided a communication apparatus capable of multi-user communication in which signals are multiplexed and communicated to one or more other communication apparatuses, the apparatus comprises: a determination unit configured to determine whether to transmit an MU-RTS (Multi User Request To Send) frame based on a size of data scheduled to be transmitted or received in accordance with the multi-user communication; and a transmission unit configured to, in a case where it is determined by the determination unit to transmit the MU-RTS frame, transmit the MU-RTS frame prior to the multi-user communication.

Further features of the present invention will become apparent from the following description of exemplary embodiments (with reference to the attached drawings).

BRIEF DESCRIPTION OF THE DRAWINGS

FIG. 11 illustrates a table of correspondences between a Trigger frame type and whether to execute transmission of an MU-RTS frame, in Embodiment 3.

FIG. 14 illustrates an examples of a flow of a DL MU communication process executed by an AP.

DESCRIPTION OF THE EMBODIMENTS

Hereinafter, the present invention will be described in detail based on examples of embodiments thereof with reference to the accompanying drawings. Note that the configurations illustrated in the following embodiments are merely examples, and the present invention is not limited to the illustrated configurations.

[Network Configuration]

Figure 1:
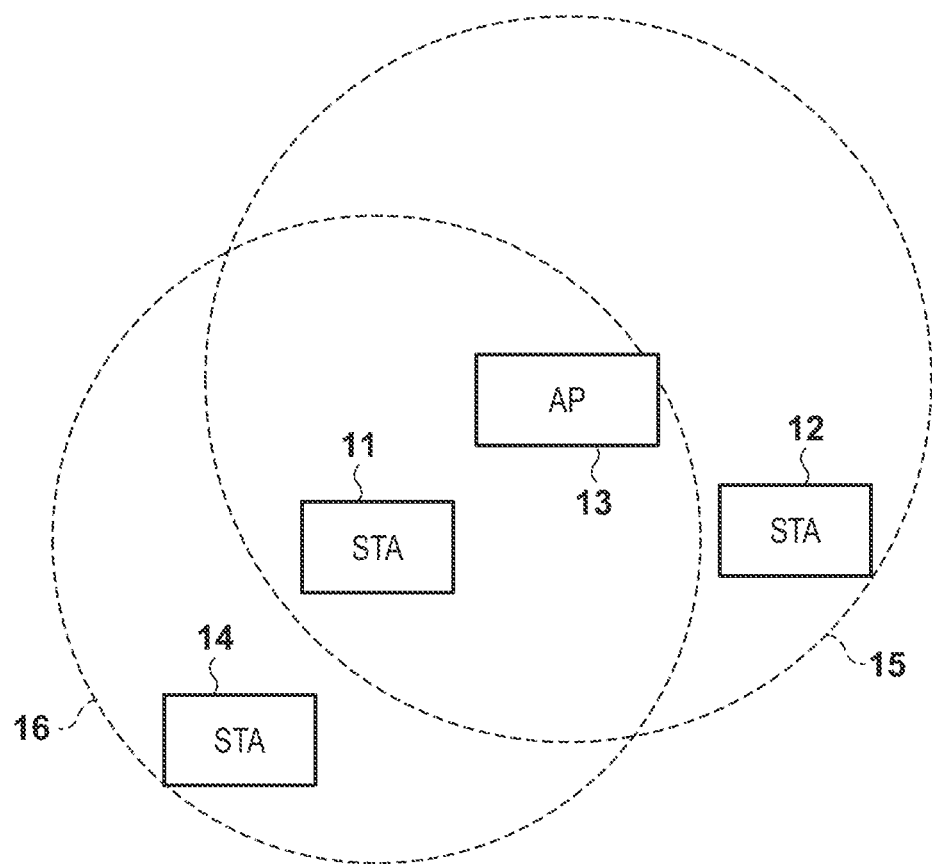
FIG. 1 illustrates an example of a network configuration in an embodiment.

FIG. 1 illustrates an example of a configuration of a network in some embodiments that are described below. FIG. 1 illustrates a configuration that includes three stations (an STA 11, an STA 12, and an STA 14) and one access point (AP 13) as HE devices. It is assumed that, as illustrated in FIG. 1, a range in which a signal transmitted by the AP 13 can be received is indicated by a circle 15, and a signal transmitted by the AP 13 can be received by the STA 11 and the STA 12, but cannot be received by the STA 14. Further, it is assumed that a signal transmitted by the STA 11 can be received within a range indicated by a circle 16, and a signal transmitted by the STA 11 can be received by AP 13 and the STA 14. However, this is an example, and the following discussion can be applied to a network that includes a large number of HE devices and legacy devices in a wide area, for example, and with respect to the positional relationship of various communication apparatuses.

In the case of FIG. 1, two STAs (STA 11 and STA 12) perform MU communication (multi-user communication) with the AP 13. In order to perform MU communication, the AP 13 may transmit an MU-RTS (MU Request To Send) frame. The STA 11 and STA 12 may transmit simultaneous CTS (Clear To Send) frames with respect to a received MU RTS frame. Note that the MU RTS frame includes information designating an STA that is to transmit a CTS frame as a response to the MU-RTS frame, and information designating a frequency on which the CTS frame is to be transmitted. Therefore, the STA 11 and the STA 12 can transmit a CTS frame on the designated frequency when they are designated, in the received MU RTS frame, as an STA that is to transmit a CTS frame.

The MU-RTS frame is transmitted in an HT PPDU, a non-HT PPDU or a non-HT Duplicate PPDU format. The MU-RTS frame transmitted in the HT PPDU format can be demodulated by an HT-supporting legacy device (a wireless LAN device of 802.11 n or later). MU-RTS frames transmitted in the format of non-HT PPDU or non-HT Duplicate PPDU can be demodulated by all legacy devices. A legacy device capable of demodulating an MU-RTS frame can update its NAV using the value of a Duration Field included in the MU-RTS frame. In the example of FIG. 1, the STA 14 cannot directly receive signals from the AP 13. However, since the STA 14 can receive a CTS frame transmitted by the STA 11, the value of the Duration field included in the CTS frame can be used to appropriately set the NAV. The NAV period is set to a corresponding MU communication period, during which each STA does not transmit data, and thus signal interference can be suppressed. In the case of the uplink, the MU communication period is a period that includes a Trigger frame (a frame for controlling uplink transmission), UL (uplink) MU data (UL PPDU), and an MU-ACK frame.

However, as described above, since MU-RTS/CTS processing is overhead for data communication, performing MU-RTS/CTS processing during all MU communication times reduces bandwidth usage efficiency. In several embodiments described below, a process of switching whether or not to perform MU-RTS transmission according to a feature of a signal in MU communication performed immediately after is described. As the feature, any one of or a plurality of a size of data to be communicated (Embodiment 1), a length of a time period for using a bandwidth in communication (Embodiment 2), and a type of a Trigger frame to be used in communication (Embodiment 3) is used.

[Ap Configuration]

Figure 2:
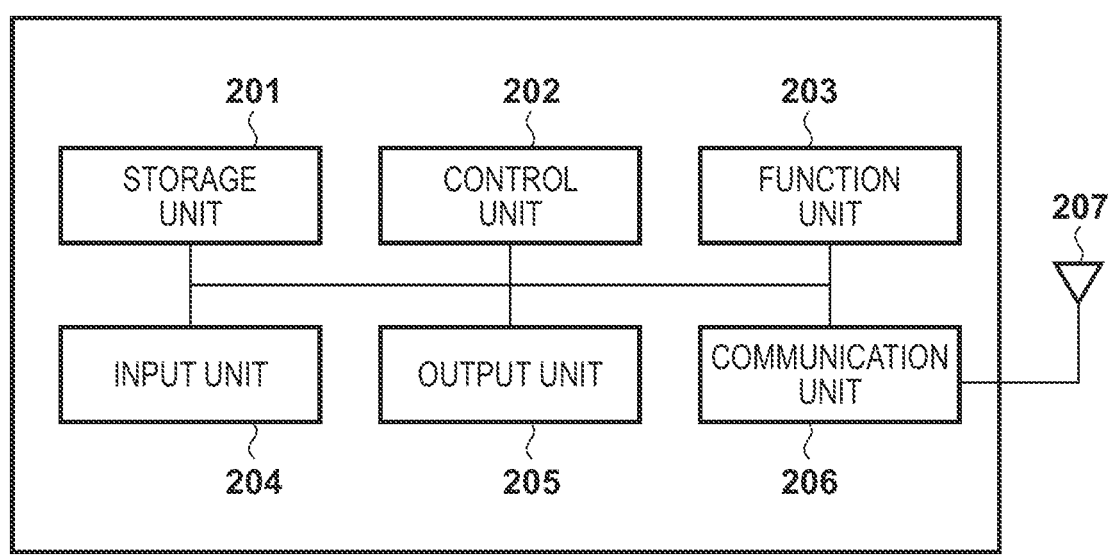
FIG. 2 illustrates an example of a hardware configuration of an AP in an embodiment.

FIG. 2 illustrates an example of a hardware configuration of the AP 13 in some embodiments that are described below. The AP 13, as an example of a hardware configuration thereof, includes a storage unit 201, a control unit 202, a function unit 203, an input unit 204, an output unit 205, a communication unit 206, and an antenna 207.

The storage unit 201 is configured by a RAM and/or a ROM, and stores various information such as programs for performing various operations described later, communication parameters for wireless communication, and the like. As the storage unit 201, in addition to a memory such as a ROM or a RAM, a storage medium such as a floppy disk, a hard disk, an optical disk, a magneto-optical disk, a CD-ROM, a CD-R, a magnetic tape, a nonvolatile memory card, a DVD, or the like may be used.

The control unit 202 is configured by, for example, a processor such as a CPU or an MPU, an application specific integrated circuit (ASIC), a digital signal processor (DSP), a field programmable gate array (FPGA), or the like. Here CPU is an acronym for Central Processing Unit and MPU is an acronym for Micro Processing Unit. The control unit 202 controls the entire AP 13 by executing programs stored in the storage unit 201. Note that the control unit 202 may control the entire AP 13 in accordance with cooperation between programs stored in the storage unit 201 and an OS (Operating System).

The control unit 202 controls the function unit 203 to execute predetermined processing such as imaging, printing, and projection. The function unit 203 is hardware for the AP 13 to execute a predetermined process. For example, when the AP 13 is a camera, the function unit 203 is an imaging unit and performs an imaging process. For example, when the AP 13 is a printer, the function unit 203 is a printing unit and performs a printing process. For example, when the AP 13 is a projector, the function unit 203 is a projection unit and performs a projection process. Data processed by the function unit 203 may be data stored in the storage unit 201, and may be data communicated from another device via a communication unit 206 which is described later.

The input unit 204 receives various operations from a user. The output unit 205 performs various outputs with respect to a user. Here, an output by the output unit 205 includes at least one of displaying on a screen, sound output by a speaker, vibration output, and the like. It should be noted that both the input unit 204 and the output unit 205 may be realized by one module as with a touch panel.

The communication unit 206 executes communication processing. The communication unit 206 can execute a communication process that complies with an IEEE 802.11ax standard, at least. The communication unit 206 controls the antenna 207 to transmit and receive wireless signals for wireless communication. The AP 13 communicates content such as image data, document data, and video data with other communication apparatuses via the communication unit 206.

Figure 3:
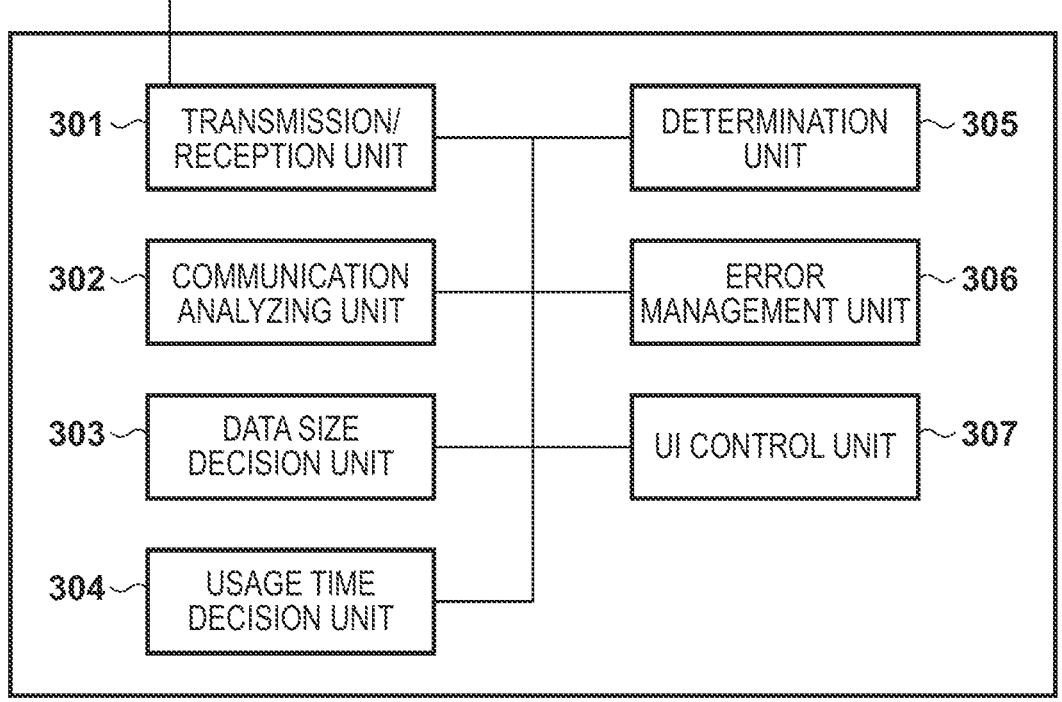
FIG. 3 illustrates an example of a functional configuration of an AP in an embodiment.

FIG. 3 illustrates an example of a functional configuration of the AP 13 in some embodiments that are described below. As an example of a functional configuration thereof, the AP 13 includes a transmission/reception unit 301, a communication analyzing unit 302, a data size decision unit 303, a usage time decision unit 304, a determination unit 305, an error management unit 306, and a UI control unit 307.

The transmission/reception unit 301 controls the communication unit 206 (FIG. 2) to transmit and receive signals. For example, the transmission/reception unit 301 transmits an MU-RTS on a designated frequency channel. The communication analyzing unit 302 analyses the content of communication with a partner device. The data size decision unit 303 decides, for example by calculation processing, a data size required for deciding whether to transmit an MU-RTS frame. The usage time decision unit 304 decides, for example by calculation processing, a bandwidth usage time required for deciding whether to transmit an MU-RTS frame. The determination unit 305 determines (decides) whether to transmit an MU-RTS frame based on signals that are scheduled to be transmitted or received in accordance with multi-user communication. The error management unit 306 manages the number of times the MU communication is unsuccessful and results in an error, and the number of consecutive errors. As a method of determining an error, in the case of UL MU communication, it can be determined that an error occurs when no UL MU packets are received from a partner STA. For example, when UL MU packets cannot be received from a particular STA n times in succession (n=3 or the like) it may be determined that UL MU communication with respect to the particular STA is in an error state. In the case of DL (downlink) MU communication, it can be determined that an error occurs when no ACK is received from a partner STA. Like UL (uplink) MU communication, the error state may be determined based on the number of consecutive errors. The number of consecutive errors is reset to 0 when communication is successful. The UI control unit 307 is configured by including hardware related to a user interface such as a touch panel or buttons for accepting operation with respect to the AP 13 by a user (not illustrated) of the AP 13, and programs for controlling the hardware.

[AP Processing Flow]

Figure 4:
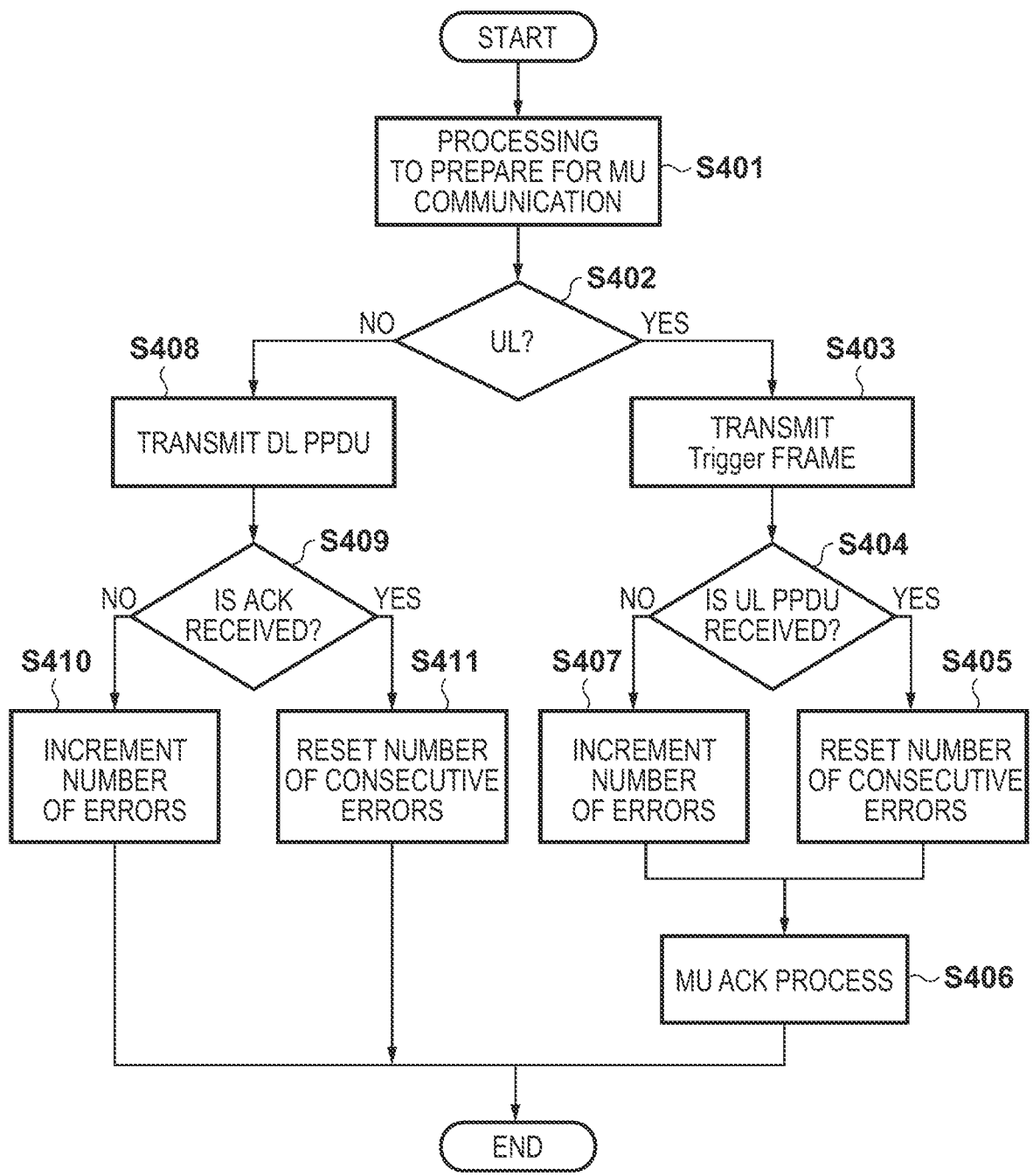
FIG. 4 illustrates an example of the flow of MU communication processing executed by an AP in an embodiment.

Next, a flow of a process executed by the AP 13 in some embodiments described below will be described. FIG. 4 is a flow chart illustrating an exemplary flow of a process in which the AP 13 executes MU communication according to an embodiment. This process is realized, for example, by the control unit 202 of the AP 13 executing a program stored in the storage unit 201. Here, it is assumed that STAs (STA 11 and STA 12 in the case of FIG. 1) are connected to the AP 13 by the MU communication method.

In this processing, the AP 13 first starts processing to prepare for MU communication (step S401). This processing will be described later with reference to FIGS. 5 to 11. Thereafter, the AP 13 starts the MU communication process, and executes MU communication according to the specification defined in the 802.11ax standard. That is, first, in step S402, the communication analyzing unit 302 determines whether the MU communication to be started is UL MU communication or DL MU communication. When the MU communication to be started is UL MU communication (YES in step S402), the transmission/reception unit 301 transmits a Trigger frame in step S403, and assigns an RU (Resource Unit) to each of its partner STAs. Next, in step S404, the transmission/reception unit 301 determines whether or not an uplink PPDU (hereinafter referred to as UL PPDU) in multi-user communication has been received from a respective STA. The UL PPDU is, for example, a UL HE MU PPDU (Uplink High efficiency Multi-user physical layer (PHY) protocol data unit).

If it is determined that an UL PPDU has been received from a particular STA (YES in step S404), in step S405, the error management unit 306 resets the number of consecutive errors corresponding to that STA. Then, in step S406, the transmission/reception unit 301 transmits an MU ACK frame to the STA. Finally, in step S406, the transmission/reception unit 301 transmits an MU ACK frame to each partner STA as an acknowledgement of the reception of the UL MU data, and ends the processing. In contrast, if it is determined that an UL PPDU has not been received from a particular STA (NO in step S404), in step S407 the error management unit 306 increments the number of errors (both of the total number of errors and the number of consecutive errors) corresponding to that STA. Finally, in step S406, the transmission/reception unit 301 performs an MU ACK process as an acknowledgement of the reception of the UL MU data. For the MU ACK process in step S406 after step S407, an MU ACK frame may or may not be transmitted. In a case where an MU ACK frame is transmitted by a BLOCK ACK method, the transmission/reception unit 301, in a BLOCK ACK, can set a bit corresponding to a received A-MPDU to thereby notify the STA as to which A-MPDU it received. When an A-MPDU is not received, the transmission/reception unit 301 can transmit a BLOCK ACK frame without setting a corresponding bit, thereby notifying that it was not able to receive the data. However, in a case where an MU ACK frame is not transmitted by the BLOCK ACK method, the transmission/reception unit 301 can notify the STA whether data has been received or not by performing control to return an ACK frame when data has been received and not return an ACK frame when data has not been received. Therefore, in step S406, the transmission/reception unit 301 transmits an MU ACK frame in the case of the BLOCK ACK method, and otherwise does not transmit an MU ACK frame. Note that the processing of step S404, step S405, and step S407 are performed for each STA to which an RU was allocated in the Trigger frame.

Meanwhile, when DL MU communication is determined in step S402 (NO in step S402), in step S408 the transmission/reception unit 301 transmits a downlink PPDU (hereinafter, DL PPDU) in the multi-user communication to each partner STA. The DL PPDU is, for example, a DL HE MU PPDU (Downlink High efficiency Multi-user physical layer (PHY) protocol data unit). In step S409, the transmission/reception unit 301 determines whether or not an ACK frame has been received as an acknowledgement from each partner STA. If it is determined that an ACK frame has been received from a particular STA (YES in step S409), in step S411, the error management unit 306 resets the number of consecutive errors corresponding to that STA, and ends the process. If it is determined that an ACK frame has not been received from a particular STA (NO in step S409), in step S410 the error management unit 306 increments the number of errors (both of the total number of errors and the number of consecutive errors) corresponding to that STA.

Next, an embodiment of the MU communication preparation process of step S401 of FIG. 4 will be described below.

Embodiment 1

In Embodiment 1, a process of switching whether or not the AP 13 transmits an MU-RTS based on a data size to be communicated in MU communication will be described.

Embodiment 1-1

Figure 5:
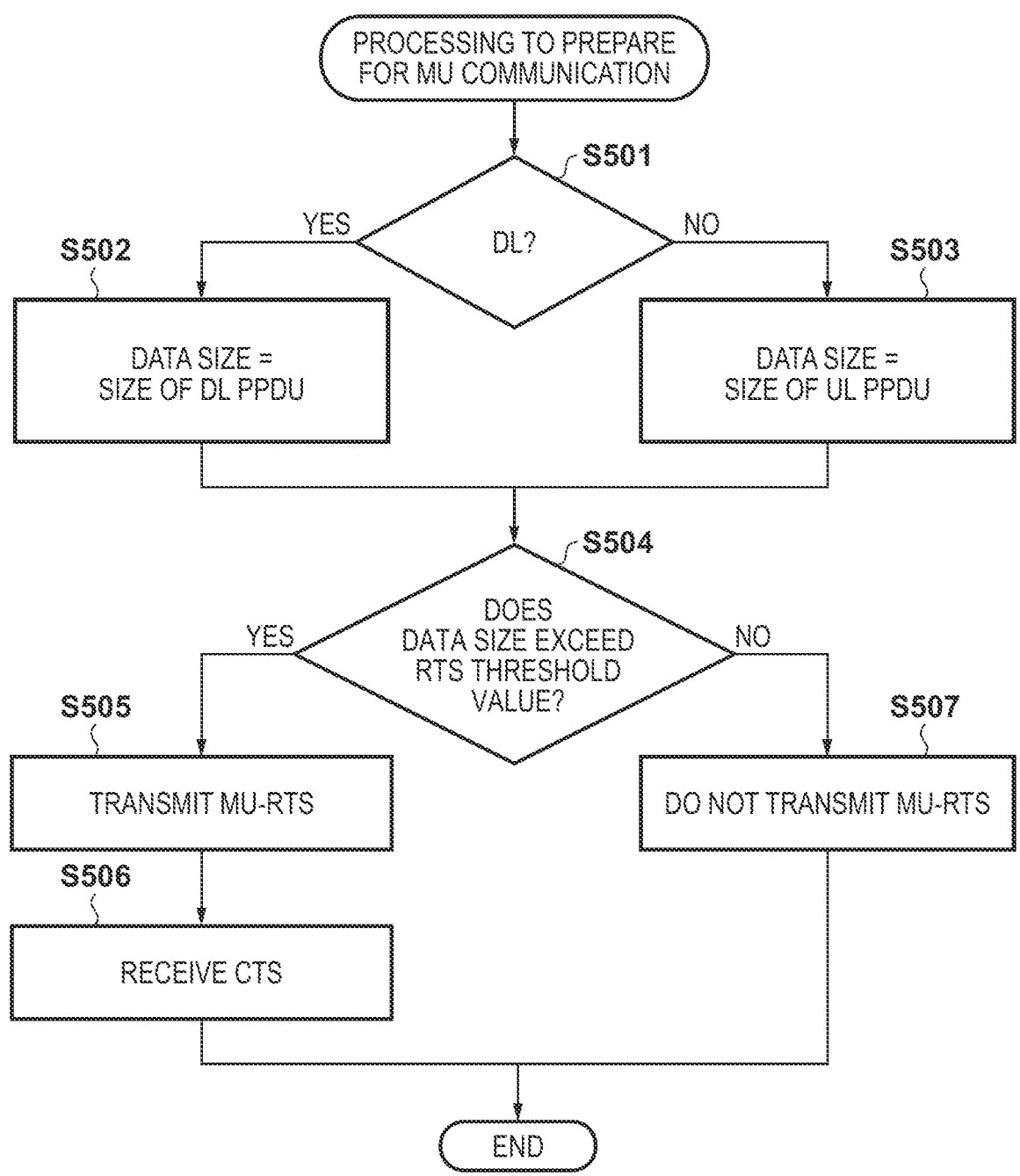
FIG. 5 illustrates an example of the flow of MU communication preparation processing executed by an AP in Embodiment 1-1.

The MU communication preparation process in Embodiment 1-1 will be described with reference to FIG. 5. FIG. 5 illustrates an example of the flow of MU communication preparation processing executed by the AP 13 in Embodiment 1-1. First, in step S501, the communication analyzing unit 302 determines whether the MU communication to be started is UL (uplink) or DL (downlink). If the MU communication to be started is DL (YES in step S501), in step S502, the data size decision unit 303 decides the data size as the size of a DL PPDU that is scheduled to be transmitted. If the MU communication to be started is UL (NO in step S501), in step S503, the data size decision unit 303 decides the data size as the size of a UL PPDU that is scheduled to be received. Because the size of the UL PPDU that is scheduled to be received matches the value set in the Length field in the Common Info field of the Trigger frame (transmitted in step S403), the data size decision unit 303 may use this. Also, the value of the Length field can be decided from an amount of data waiting to be transmitted by each partner STA. The amount of data waiting to be transmitted by each STA can be notified to the AP 13 by a Buffer Status Report (BSR). If the transmission/reception unit 301 has not received a BSR, it may transmit a BSRP Trigger frame to the STAs and request the BSR. Note that, in a case where RUs are allocated to a plurality of STAs in a Trigger frame, the data size can be decided based on the amount of data waiting to be transmitted of the STA having the highest amount of data waiting to be transmitted from among the plurality of STAs.

When the data size is decided in step S502 or step S503, the determination unit 305 determines, in step S504, whether or not the decided data size exceeds a preset RTS threshold value. The RTS threshold value may be the same value for SU (Single User) and MU, or may be a different value. In the case of MU, it is assumed that the AP 13 has a higher probability of failing communication due to the effect of a hidden terminal than the probability of failing communication in the case of SU, in accordance with the interaction with a plurality of partner STAs. In view of this, the RTS threshold value for MU may be set to be a smaller value than the RTS threshold value for SU. If the decided data size exceeds the RTS threshold value (YES in step S504), the transmission/reception unit 301 transmits an MU-RTS frame in step S505, receives a CTS frame in step S506, and ends the process. Here, the transmission/reception unit 301 may transmit the MU-RTS frame in an HT PPDU format or may transmit the frame in a non-HT PPDU format. However, if the decided data size does not exceed the RTS threshold value (NO in step S504), in step S507, the AP 13 ends the process without transmitting an MU-RTS frame.

As described above, in Embodiment 1-1, when the data size decided for the MU communication that is to be started exceeds the RTS threshold value, an MU-RTS is transmitted, and otherwise, an MU-RTS is not transmitted. In other words, in MU communication, in a case of transmitting or receiving data that occupies a longer period, an MU-RTS for which a goal is for a NAV setting to be made with respect to a hidden terminal which may exist beyond a partner STA is transmitted. As a result, since the hidden terminal can receive a CTS frame, it is possible to suppress the possibility of signal collision occurring and improve the probability of success of MU communication.

Embodiment 1-2

Figure 6:
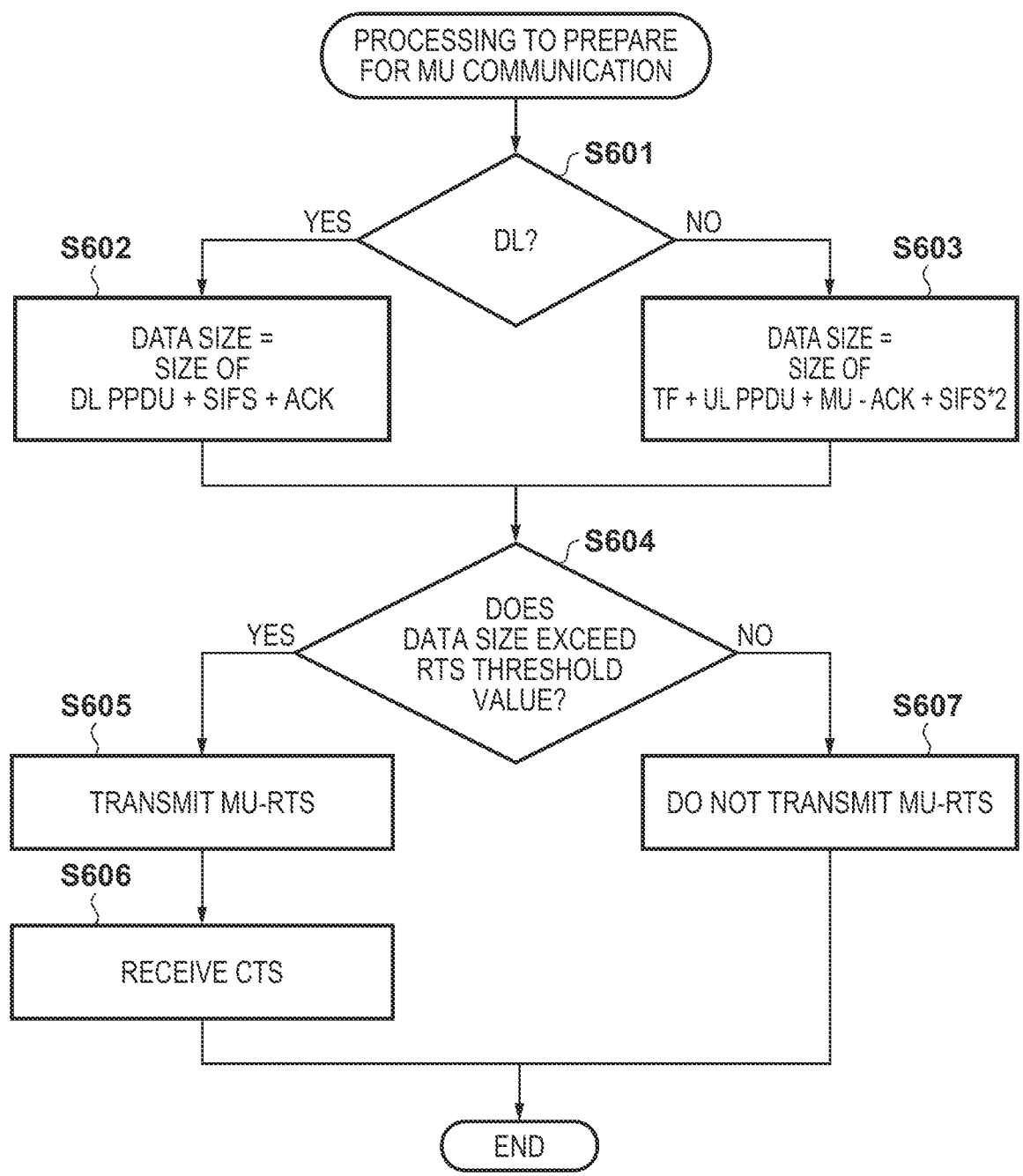
FIG. 6 illustrates an example of the flow of MU communication preparation processing executed by an AP in Embodiment 1-2.

The MU communication preparation process in Embodiment 1-2 will be described with reference to FIG. 6. FIG. 6 illustrates an example of the flow of MU communication preparation processing executed by the AP 13 in Embodiment 1-2. Step S601 and step S604 to step S607 are the same processes as those of step S501 and step S504 to step S507 of FIG. 5 described in Embodiment 1-1, respectively, and therefore descriptions thereof are omitted.

If the MU communication to be started is DL (YES in step S601), in step S602, the data size decision unit 303 decides the data size as the total of the size of a DL PPDU that is scheduled to be transmitted, a size corresponding to a SIFS (Short Interframe Space), and the size of an ACK frame.

An SIFS is an amount of time that is uniquely decided by the PHY specification used. A size corresponding to the SIFS can be calculated by [SIFS×data rate used]. For the data rate, the rate used to transmit the DL PPDU may be used, and a minimum rate specified by the PHY specification may be used.

The size of an ACK frame is the size of an ACK frame that a partner STA is expected to transmit. For example, if only one MPDU is included in the DL PPDU, it is expected that an ACK frame will be transmitted from a partner STA. In contrast, if a plurality of MPDUs are included in the DL PPDU, it is expected that a BLOCK ACK frame will be transmitted from a partner STA.

In the case of an ACK frame, the MAC frame is defined by 14 octets, and a preamble and a header according to the PHY specification used for ACK frame transmission are added to the MAC frame. For example, when the 802.11b long frame format is used, a PLCP preamble of 144 bits and a PLCP header of 48 bits are added. Therefore, data of 144+48+14×8=304 bits becomes the size of the ACK frame.

In the case of a BLOCK ACK frame, the MAC header portion is 16 octets, and the MAC body portion has a variable length depending on a BlockAck type. For example, in a Multi-TID BlockAck, if the BlockAckBitmap is 8 octets, the Per AID TID Info of 12 octets is repeated for the number of TIDs to be transmitted. Since the BA Control field and the FCS field are 6 octets in total, the MAC body portion can be calculated as 6+12×number of TIDs octets. A preamble and a header corresponding to the PHY specification to be used are added. For example, when the 802.11b long frame format is used, data of 144+48+(16+6+12×number of TIDs)×8 bits is the size of the BLOCK ACK frame.

The size of the ACK frame can also be calculated by a different method. For example, a TRS Control field included in a DL PPDU is used to cause the DL PPDU to serve as a Trigger frame. As a result, an ACK frame for the DL PPDU can be transmitted as an UL PPDU to each partner device. In this case, since an HE TB PPDU Length included in the TRS Control field has a size corresponding to a subsequent ACK portion, the data size can be calculated using the ACK portion.

Meanwhile, when the MU communication to be started is UL (NO in step S601), in step S603 the data size decision unit 303 decides the data size to be the sum of the size of the Trigger frame (TF) (to be transmitted in step S403), the size of an UL PPDU that is scheduled to be received, the size of an MU-ACK frame that is scheduled to be transmitted thereafter, and a size corresponding to two SIFSs.

For a Trigger frame, its size is defined by a 16 octet MAC header portion, and a MAC body portion that is 12+UserInfo field×number of users+padding length. The UserInfo field is defined by a fixed length of 5 octets+a variable portion that depends on a Trigger frame type. In a case where a Basic Trigger Variant is used to initiate UL MU, the variable portion is defined as one octet. The padding length is defined from a HE Capabilities element included in a Management frame transmitted by an STA that is to be connected to. The HE Capabilities element contains a 2-bit Trigger Frame MAC Padding Duration, whose value defines the padding length that each STA requires of the AP. When the value is 0, no padding is required, when the value is 1, a padding duration of 8 usec is required, and when the value is 2, a padding duration of 16 μsec is required. The AP 13 decides the padding length by adopting the largest of the requirements of all STAs subject to UL MU communication. The padding length is calculated as the padding duration×the data rate used.

Since the size of the UL PPDU that is scheduled to be received can be decided similarly to the method described in Embodiment 1-1, description thereof is omitted. Since the size of the MU-ACK frame that is scheduled to be transmitted and a size corresponding to the SIFS are similar to the case of DL, descriptions thereof are omitted.

As described above, in Embodiment 1-2, similarly to Embodiment 1-1, when data occupying a longer period is transmitted and received in MU communication, an MU-RTS for which a goal is for a NAV setting to be made with respect to a hidden terminal that may exist beyond a partner STA is transmitted. As a result, since the hidden terminal can receive a CTS frame, it is possible to suppress the possibility of signal collision occurring and improve the probability of success of MU communication.

Embodiment 1-3

Figure 7:
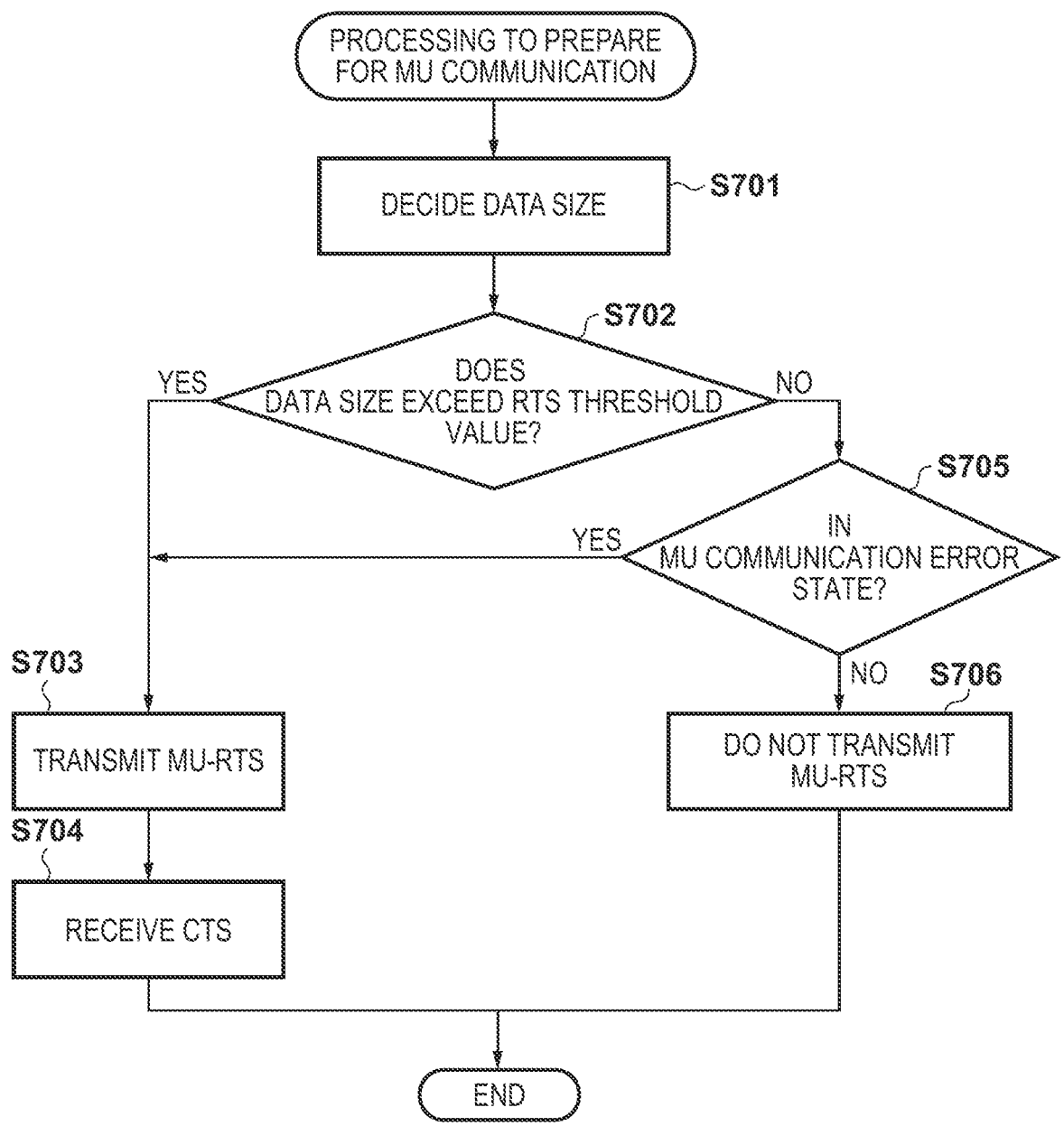
FIG. 7 illustrates an example of the flow of MU communication preparation processing executed by an AP in Embodiment 1-3.

The MU communication preparation process in Embodiment 1-3 will be described with reference to FIG. 7. FIG. 7 illustrates an example of the flow of MU communication preparation processing executed by the AP 13 in Embodiment 1-3. Regarding the data size decision processing of step S701, it is assumed that either the processing of step S501 to step S503 of FIG. 5 described in Embodiment 1-1 or the processing of step S601 to step S603 of FIG. 6 described in Embodiment 1-2 is executed. In addition, step S703, step S704, and step S706 are the same processes as those of step S505, step S506, and step S507 of FIG. 5 described in Embodiment 1-1, respectively, and therefore descriptions thereof are omitted. In addition, it assumed that the RTS threshold value is defined in the same manner as in Embodiment 1-1.

If it is determined that the data size decided in step S701 exceeds the RTS threshold value (YES in step S702), the process proceeds to step S703. Meanwhile, when it is determined that the data size decided in step S701 does not exceed the RTS threshold value (NO in step S702), in step S705, the error management unit 306 determines whether the MU communication is in an error status. This determination is made based on a cumulative number of errors or a number of consecutive errors of MU transmission, for each STA managed by the error management unit 306. For example, when the number of consecutive errors for a target STA is n (for example, n=3), the error management unit 306 can determine the error state. However, the method of error determination is not limited to this, and the error state may be determined when the total number of errors is m (for example, m=10). If the error state is determined in step S705 (YES in step S705), the process proceeds to step S703, and if the error state is not determined (NO in step S705), the process proceeds to step S706.

As described above, in Embodiment 1-3, even if the decided data size does not exceed the RTS threshold value, in a situation where the probability of successful MU communication is low, an MU-RTS for which a goal is for a NAV setting to be made with respect to a hidden terminal which may exist beyond a partner STA is transmitted. This makes it possible to suppress the possibility of signal collision occurring and to improve the probability of success of MU communication.

Embodiment 2

In Embodiment 1, a process of switching whether or not the AP 13 transmits an MU-RTS based on a bandwidth usage time in MU communication will be described.

Embodiment 2-1

Figure 8:
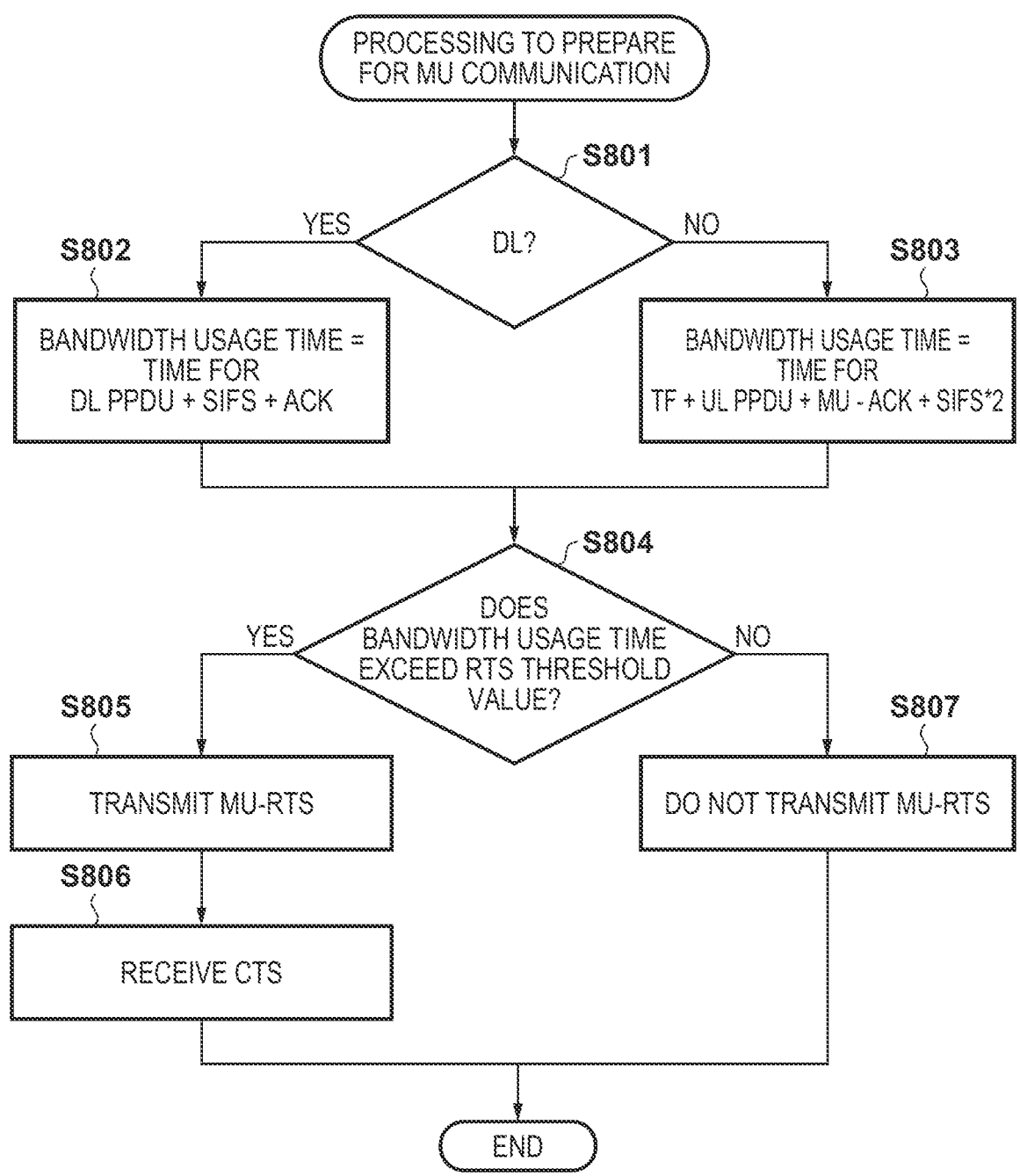
FIG. 8 illustrates an example of the flow of MU communication preparation processing executed by an AP in Embodiment 2-1.

The MU communication preparation process in Embodiment 2-1 will be described with reference to FIG. 8. FIG. 8 illustrates an example of the flow of MU communication preparation processing executed by the AP 13 in Embodiment 2-1. Step S801 and step S804 to step S807 are the same processes as those of step S501 and step S504 to step S507 of FIG. 5 described in Embodiment 1-1, respectively, and therefore descriptions thereof are omitted. However, the RTS threshold value in step S804 is defined not as the threshold value of the data size but as the threshold value of the bandwidth usage time.

If the MU communication to be started is DL (YES in step S801), the usage time decision unit 304 decides the bandwidth usage time in step S802 as the sum of amounts of time for a DL PPDU and an ACK frame, and the SIFS. For this value, it is possible to use a value set for the Duration field value included in the MAC header portion of the DL PPDU. If the MU communication to be started is UL (NO in step S801), in step S803, the usage time decision unit 304 decides the bandwidth usage time as amounts of time for the Trigger frame, a UL PPDU, and an MU-ACK frame+SIFS×2. For this value, it is possible to use a value set for the Duration field value included in the MAC header portion of a Trigger frame.

As described above, in Embodiment 2-1, when the bandwidth usage time for the MU communication that is to be started exceeds the RTS threshold value, an MU-RTS is transmitted, and otherwise, an MU-RTS is not transmitted. In other words, in MU communication, in a case of transmitting or receiving data that occupies a longer period of time, an MU-RTS for which a goal is for a NAV setting to be made with respect to a hidden terminal which may exist beyond a partner STA is transmitted. As a result, since the hidden terminal can receive a CTS frame, it is possible to suppress the possibility of signal collision occurring and improve the probability of success of MU communication.

Embodiment 2-2

Figure 9:
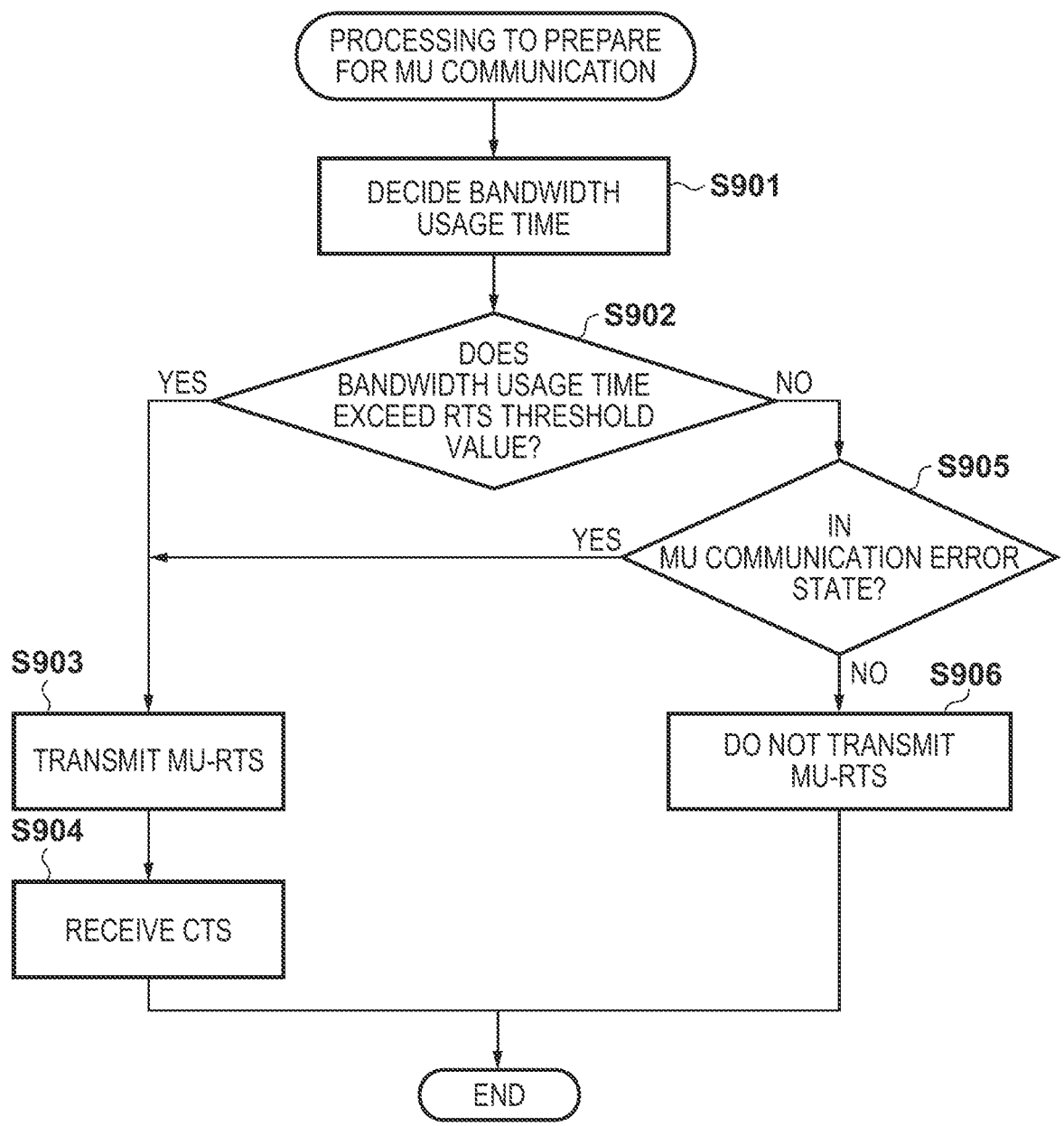
FIG. 9 illustrates an example of the flow of MU communication preparation processing executed by an AP in Embodiment 2-2.

The MU communication preparation process in Embodiment 2-2 will be described with reference to FIG. 9. FIG. 9 illustrates an example of the flow of MU communication preparation processing executed by the AP 13 in Embodiment 2-2. Step S802 to step S803 of FIG. 6 described in Embodiment 2-1 are performed to calculate the bandwidth usage time of step S901. Step S903 to step S906 are the same processes as those of step S703 to step S706 of FIG. 7 described in Embodiment 1-3, respectively, and therefore descriptions thereof are omitted. Step S902 is the same process as that in step S804 of FIG. 8 described in Embodiment 2-1, and therefore description thereof is omitted.

As described above, in Embodiment 2-2, even if the decided bandwidth usage time does not exceed the RTS threshold value, in a situation where the probability of successful MU communication is low, an MU-RTS for which a goal is for a NAV setting to be made with respect to a hidden terminal which may exist beyond a partner STA is transmitted. This makes it possible to suppress the possibility of signal collision occurring and to improve the probability of success of MU communication.

Embodiment 3

In Embodiment 3, a process will be described in which the AP 13 determines the type of the Trigger frame to be transmitted and switches whether or not to transmit the MU-RTS frame in accordance with the type.

Embodiment 3-1

Figure 10:
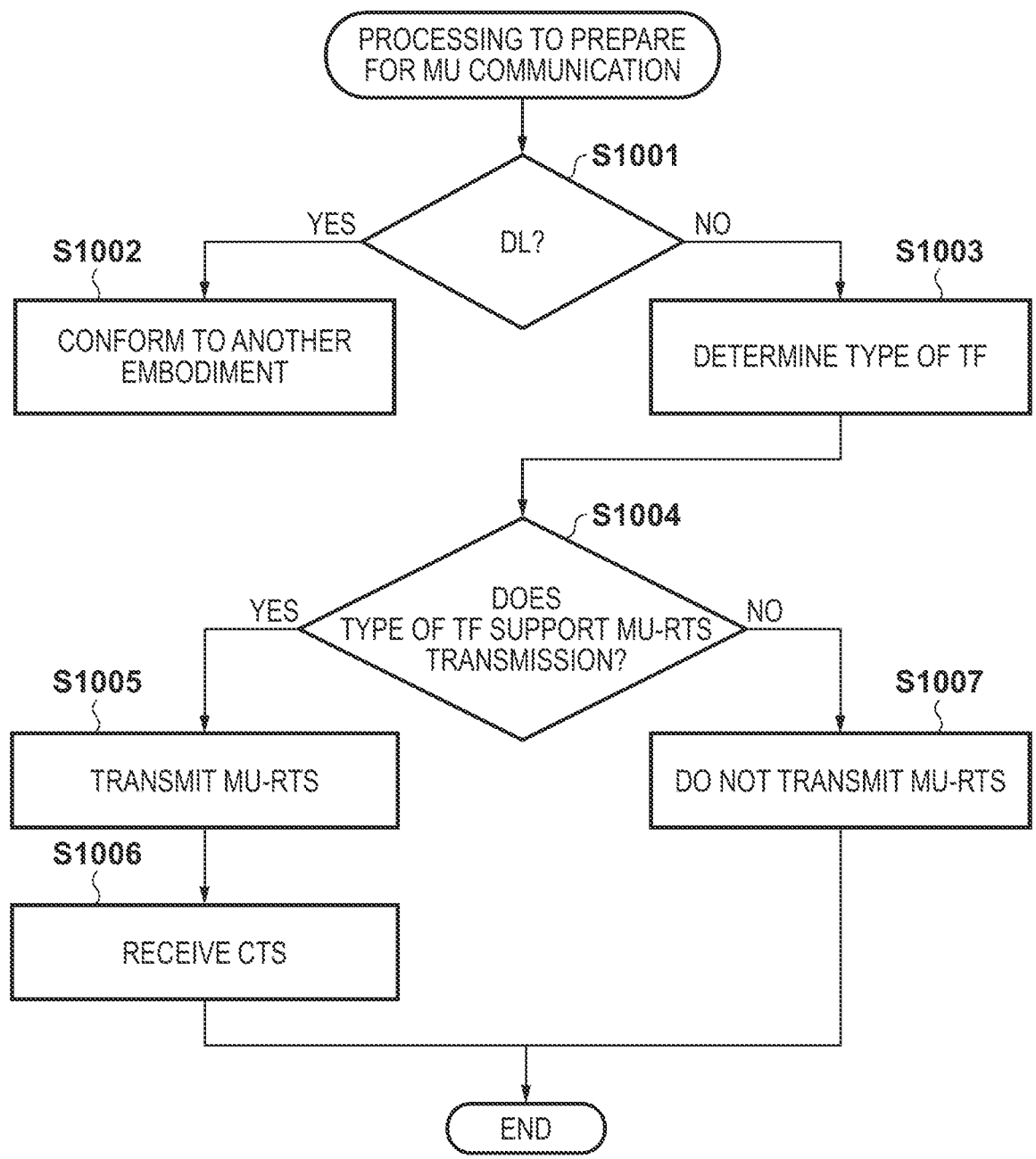
FIG. 10 illustrates an example of the flow of MU communication preparation processing executed by an AP in Embodiment 3-1.

The MU communication preparation process in Embodiment 3-1 will be described with reference to FIG. 10. FIG. 10 illustrates an example of the flow of MU communication preparation processing executed by the AP 13 in Embodiment 3-1. Step S1005 to step S1007 are the same processes as those of step S505 to step S507 of FIG. 5 described in Embodiment 1, respectively, and therefore descriptions thereof are omitted.

If the MU communication to be started is DL (YES in step S1001), the process proceeds to step S1002. Step S1002 conforms to a DL communication process of Embodiments 1 to 2. For example, in Embodiment 1-1, step S502 and subsequent flows are followed. If the MU communication to be started is UL (NO in step S1001), the communication analyzing unit 302 determines the type of the Trigger frame in step S1003. FIG. 11 illustrates a table of correspondences 1100 between a Trigger frame type and whether to execute transmission of an MU-RTS frame. The communication analyzing unit 302 refers to the table of correspondences 1100 as illustrated in FIG. 11 to thereby switch the MU-RTS transmission control for each Trigger frame type. Note that the table of correspondences 1100 illustrated in FIG. 11 is an example, and there is no limitation thereto. The table of correspondences 1100 may be dynamically updated. Further, the relation between Trigger frame types and MU-RTS transmission may be defined based on the data size and bandwidth usage time used for a response to each respective Trigger frame. For example, it may be specified to calculate the largest size that a response to a Trigger frame can be, and to transmit an MU-RTS when the size exceeds a set RTS threshold value. When the table of correspondences 1100 illustrated in FIG. 11 is used, if it is determined in step S1003 that the type of the Trigger frame to be transmitted is the Basic type, in step S1004 the communication analyzing unit 302 determines that the type of the Trigger frame corresponds to MU-RTS transmission, and the process proceeds to step S1005. Meanwhile, when it is determined in step S1003 that the type of the Trigger frame to be transmitted is a BFRP type, in step S1004 the communication analyzing unit 302 determines that the type of the Trigger frame does not correspond to MU-RTS transmission, and the process proceeds to step S1007.

As described above, in Embodiment 3-1, by using a table of correspondences between the Trigger frame type and MU-RTS control, MU-RTS transmission control can be switched without deciding the data size or the bandwidth usage time.

Embodiment 3-2

Figure 12:
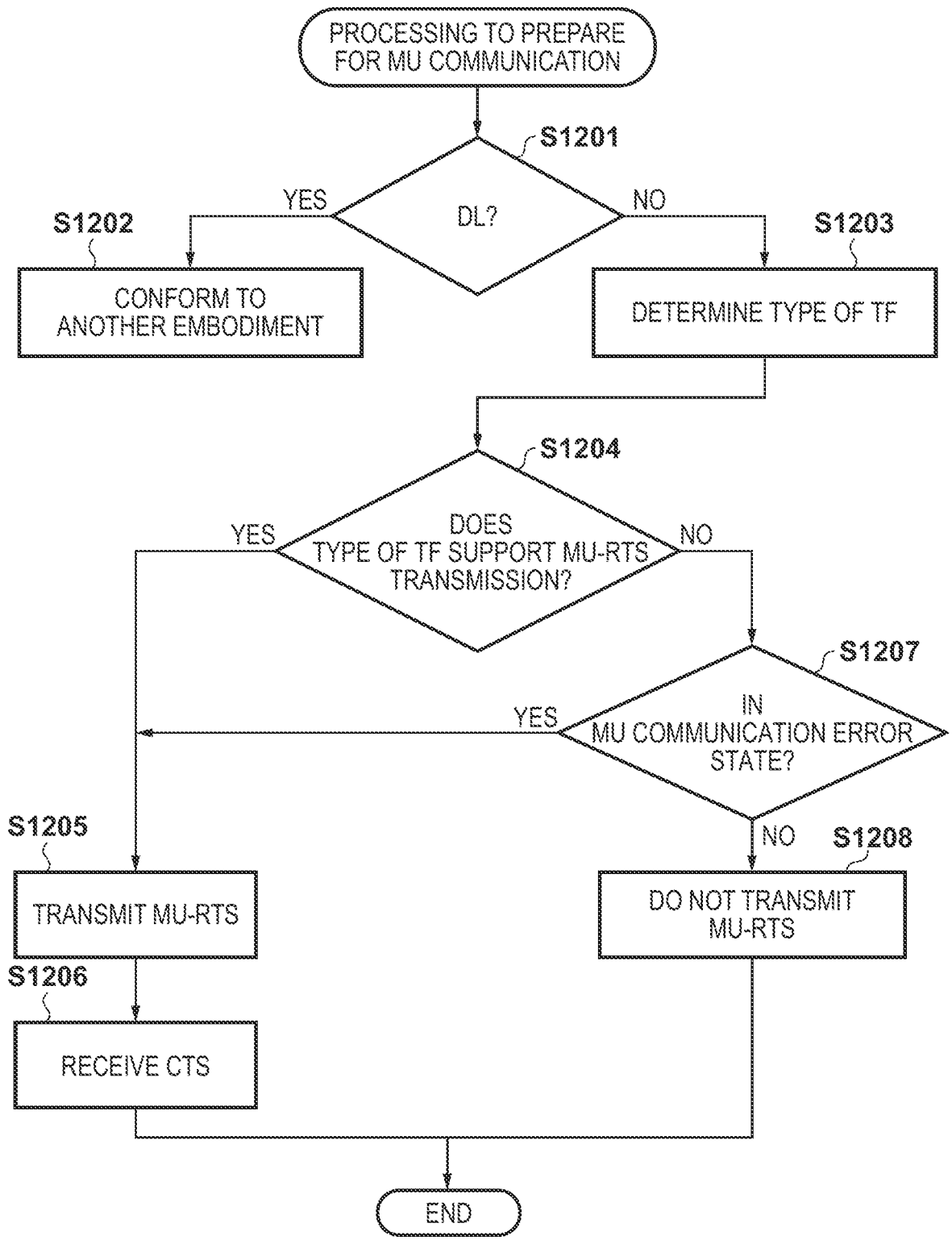
FIG. 12 illustrates an example of the flow of MU communication preparation processing executed by an AP in Embodiment 3-2.

The MU communication preparation process in Embodiment 3-2 will be described with reference to FIG. 12. FIG. 12 illustrates an example of the flow of MU communication preparation processing executed by the AP 13 in Embodiment 3-2. Step S1201 to step S1203 are similar processes to step S1001 to step S1003 of FIG. 10 described in Embodiment 3-1, and step S1205 to step S1208 are similar processes to step S703 to step S706 of FIG. 7 described in Embodiment 1-3, and therefore descriptions thereof are omitted. In step S1204, if it is determined that the type of the Trigger frame to be transmitted is not compatible with MU-RTS transmission, the process proceeds to step S1207.

As described above, in Embodiment 3-2, in a situation where the probability of success of MU communication is low, it is possible to increase the probability of success of MU communication by transmitting an MU-RTS frame for which a goal is for NAV setting to be made with respect to a hidden terminal that may exist beyond a partner STA.

[AP and STA Processing Flow]

Figure 13:
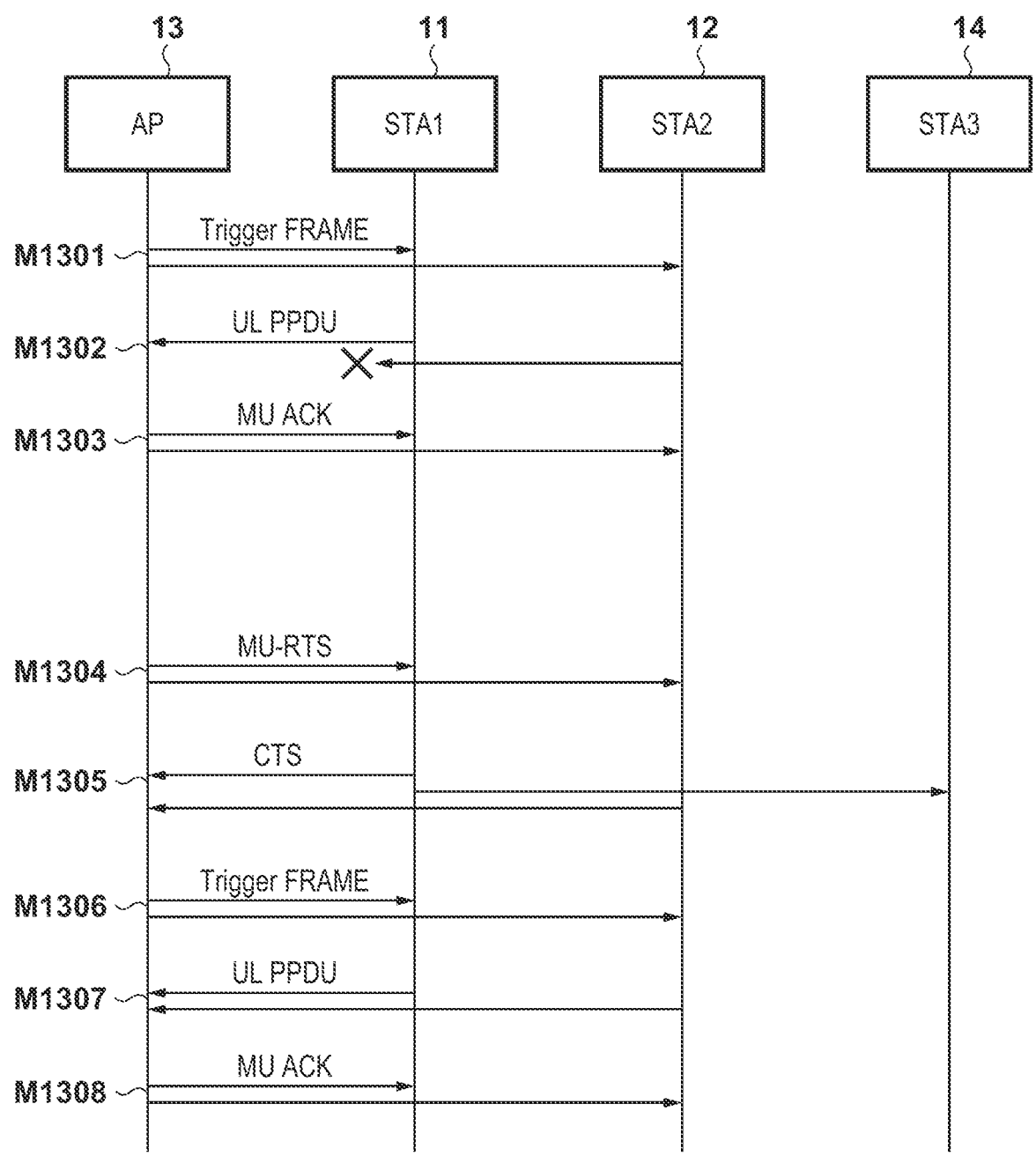
FIG. 13 illustrates an examples of a flow of a UL MU communication process executed by an AP.

Referring to FIG. 13, a UL MU communication sequence that utilizes the above-described embodiments will be described. FIG. 13 illustrates an examples of a flow of a UL MU communication process executed by the AP 13. It is assumed that the AP 13, the STA 11, the STA 12, and the STA 14 are arranged as illustrated in FIG. 1. When starting UL MU communication, the AP 13 performs any of the MU communication preparation processes described in Embodiments 1 to 3 to determine whether or not to send an MU-RTS frame. It is assumed that, in the MU communication starting from M1301, a determination has been made to not send an MU-RTS frame. In contrast, it is assumed that, in the MU communication starting from M1304, a determination has been made to send an MU-RTS frame.

In M1301, the AP 13 transmits a Trigger frame without transmitting an MU-RTS frame. Here, the targets of the MU UL communication are the STA 11 and the STA 12. In M1302, the STA 11 and the STA 12 that have received the Trigger frame each transmit an UL PPDU addressed to the AP 13 by using a RU (Resource Unit) allocated. Here, it is assumed that the UL PPDU from the STA 12 does not reach the AP 13. In such a case, the AP 13 then increments the number of errors for the STA 12 and manages the number of errors. In M1303, the AP 13 transmits the MU ACK frame to the STA 11 and the STA 12, and ends the MU communication. Since the AP 13 was unable to receive the UL PPDU from the STA 12, it may set the corresponding BLOCK ACK of the BLOCK ACK frame to 0 to notify that this was not received. Here, since the AP 13 could not receive the UL PPDU from the STA 12, it may transmit the Trigger frame again and request the STA 12 to retransmit the UL PPDU.

In M1304, the AP 13 transmits an MU-RTS frame before transmitting a Trigger frame. The STA 11 and the STA 12 that have received the MU-RTS frame determine that they are subject to MU communication, and in M1305, transmit a CTS frame. The CTS frame transmitted by the STA 11 is also received by the STA 14, and as a result an MU communication period is set to the NAV of the STA 14. The AP 13 that received the CTS frames transmits a Trigger frame from M1306. In M1307, the STA 11 and the STA 12 that have received the Trigger frame each transmit an UL PPDU addressed to the AP 13 by using the allocated RU. Here, the AP 13 resets the number of consecutive errors for the STA 12. In M1308, the AP 13, which has received the UL PPDU, transmits an MU ACK frame to the STA 11 and the STA 12, and ends the MU communication.

Next, using FIG. 14, a DL MU communication sequence that utilizes the above-described embodiments will be described. FIG. 14 illustrates an examples of a flow of a DL MU communication process executed by the AP 13. It is assumed that the AP 13, the STA 11, the STA 12, and the STA 14 are arranged as illustrated in FIG. 1. When starting DL MU communication, the AP 13 performs any of the MU communication preparation processes described in Embodiments 1 to 3 to determine whether or not to send an MU-RTS frame. It is assumed that, in the MU communication starting from M1401, a determination has been made to not send an MU-RTS frame. In contrast, it is assumed that, in the MU communication starting from M1403, a determination has been made to send an MU-RTS frame.

In M1401, the AP 13 transmits a DL PPDU without transmitting an MU-RTS frame. Here, the targets of the MU DL communication are the STA 11 and the STA 12. The STA 11 and the STA 12, which have received the DL PPDU, each transmit an ACK frame to the AP 13 in M1402. If there is a TRS Control sub-field in the DL PPDU received in M1401, the ACK frame is transmitted using the RU allocated in the field. Here, it is assumed that the AP 13 cannot receive the ACK frame from the STA 12. In such a case, the AP 13 then increments the number of errors for the STA 12 and manages the number of errors.

In M1403, the AP 13 transmits an MU-RTS frame before transmitting a DL PPDU. The STA 11 and the STA 12 that have received the MU-RTS frame determine that they are subject to MU communication, in M1404, transmit a CTS frame. The CTS frame transmitted by the STA 11 is also received by the STA 14, and as a result an MU communication period is set to the NAV of the STA 14. The AP 13 that received the CTS frames transmits a DL PPDU from M1405. The STA 11 and the STA 12, which have received the DL PPDU, each transmit an ACK frame addressed to the AP 13. If there is a TRS Control sub-field in the DL PPDU received in M1405, the ACK frame is transmitted using the RU allocated in the field. Here, the AP 13 resets the number of consecutive errors for the STA 12, and ends the MU communication.

In this manner, according to the embodiments described above, interference suppression control with respect to communication with the communication apparatus can be appropriately executed in accordance with the content of immediately succeeding communication.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188613, filed Oct. 3, 2018 which is hereby incorporated by reference herein in its entirety.

What is claimed is:

1. A communication apparatus that functions as an access point and is capable of multi-user communication in which signals are multiplexed and communicated to one or more other communication apparatuses, the communication apparatus comprising:
one or more processors; and
one or more memories including instructions that, when executed by the one or more processors, cause the communication apparatus to:
in a case of performing the multi-user communication with a station device in an uplink, determine, based on a size of data scheduled to be received by the communication apparatus based on the highest amount of data among a plurality of amounts of data, wherein each of the plurality of amounts of data is notified by a BSR (Buffer Status Report) from each of plurality of station devices to which an RU is allocated, whether to transmit an MU-RTS (Multi User Request To Send) frame; and
transmit the MU-RTS frame prior to the multi-user communication with the station device in a case where it is determined to transmit the MU-RTS frame, wherein the MU-RTS frame is not transmitted prior to the multi-user communication with the station device in a case where it is determined not to transmit the MU-RTS frame.

2. The communication apparatus according to claim 1, wherein the MU-RTS frame is determined to be transmitted in a case where the size of data scheduled to be received in accordance with the multi-user communication exceeds a predetermined threshold value.

3. The communication apparatus according to claim 2, wherein, the size is a size of an uplink (UL) PPDU (PLCP Protocol Data Unit).

4. The communication apparatus according to claim 1, wherein the execution of the instructions further causes the communication apparatus to:
determine whether the multi-user communication is in an error state,
wherein the determination of whether to transmit the MU-RTS is made based on a result of the determination of whether the multi-user communication is in an error state.

5. The communication apparatus according to claim 1, wherein the execution of the instructions further causes the communication apparatus to:
in a case of performing the multi-user communication with the station device in a downlink, determine whether to transmit an MU-RTS (Multi User Request To Send) frame.

6. The communication apparatus according to claim 5, wherein the MU-RTS frame is determined to be transmitted in a case where a size of data scheduled to be transmitted in accordance with the multi-user communication exceeds a predetermined threshold value.

7. The communication apparatus according to claim 6, wherein the size is a size of a downlink (DL) PPDU (PLCP Protocol Data Unit).

8. The communication apparatus according to claim 1, wherein the execution of the instructions causes the communication apparatus to, in a case where it is determined to transmit the MU-RTS frame, transmit to the station device the MU-RTS frame and a Trigger frame that allocates an RU (Resource Unit), and then receive a UL PPDU from the station device.

9. The communication apparatus according to claim 1, wherein the execution of the instructions causes the communication apparatus to, in a case where it is determined to transmit the MU-RTS frame, transmit to the station device a Trigger frame that allocates an RU (Resource Unit) after transmitting the MU-RTS frame.

10. The communication apparatus according to claim 1, wherein the determination of whether to transmit the MU-RTS is made based on a bandwidth usage time.

11. The communication apparatus according to claim 1, wherein the determination of whether to transmit the MU-RTS is made based on a type of a Trigger frame.

12. The communication apparatus according to claim 1, wherein the execution of the instructions causes the communication apparatus to, in a case where the multi-user communication is an error state, transmit the MU-RTS regardless of the determination of whether to transmit the MU-RTS.

13. A method of controlling a communication apparatus that functions as an access point and is capable of multi-user communication in which signals are multiplexed and communicated to one or more other communication apparatuses, the method comprising:
in a case of performing the multi-user communication with a station device in an uplink, determining, based on a size of data scheduled to be received by the communication apparatus based on the highest amount of data among a plurality of amounts of data, wherein each of the plurality of amounts of data is notified by a BSR (Buffer Status Report) from each of plurality of station devices to which an RU is allocated, whether to transmit an MU-RTS (Multi User Request To Send) frame; and
transmitting the MU-RTS frame prior to the multi-user communication with the station device in a case where it is determined to transmit the MU-RTS frame, wherein the MU-RTS frame is not transmitted prior to the multi-user communication with the station device in a case where it is determined not to transmit the MU-RTS frame.

14. A non-transitory computer-readable storage medium storing a computer program for causing a computer to execute a method of controlling a communication apparatus that functions as an access point and is capable of multi-user communication in which signals are multiplexed and communicated to one or more other communication apparatuses, the method comprising:
in a case of performing the multi-user communication with a station device in an uplink, determining, based on a size of data scheduled to be received by the communication apparatus based on the highest amount of data among a plurality of amounts of data, wherein each of the plurality of amounts of data is notified by a BSR (Buffer Status Report) from each of plurality of station devices to which an RU is allocated, whether to transmit an MU-RTS (Multi User Request To Send) frame; and
transmitting the MU-RTS frame prior to the multi-user communication with the station device in a case where it is determined to transmit the MU-RTS frame, wherein the MU-RTS frame is not transmitted prior to the multi-user communication with the station device in a case where it is determined not to transmit the MU-RTS frame.

* * * * *